US012679572B2

(12) United States Patent
Cohen

(10) Patent No.: US 12,679,572 B2
(45) Date of Patent: Jul. 14, 2026

(54) DYNAMIC DRIVE

(71) Applicant: Trim Robotics Ltd., Yakum (IL)

(72) Inventor: Jonathan Cohen, Yakum (IL)

(73) Assignee: Trim Robotics Ltd., Yakum (IL)

( * ) Notice: Subject to any disclaimer, the term of this patent is extended or adjusted under 35 U.S.C. 154(b) by 201 days.

(21) Appl. No.: 18/273,310

(22) PCT Filed: Jan. 21, 2022

(86) PCT No.: PCT/IL2022/050093
§ 371 (c)(1),
(2) Date: Jul. 20, 2023

(87) PCT Pub. No.: WO2022/157778
PCT Pub. Date: Jul. 28, 2022

(65) Prior Publication Data
US 2024/0083604 A1 Mar. 14, 2024

Related U.S. Application Data

(60) Provisional application No. 63/139,853, filed on Jan. 21, 2021.

(51) Int. Cl.
B64U 30/20 (2023.01)
B64U 10/14 (2023.01)
(Continued)

(52) U.S. Cl.
CPC ............. B64U 30/20 (2023.01); B64U 10/14 (2023.01); B64U 30/297 (2023.01); G05D 1/495 (2024.01); B64U 60/50 (2023.01); B64U 2201/20 (2023.01)

(58) Field of Classification Search
CPC ...................................................... B64U 30/20
See application file for complete search history.

(56) References Cited

U.S. PATENT DOCUMENTS 2,987,272 A 6/1961 Vogt
9,630,710 B2 4/2017 Hutson
(Continued)

FOREIGN PATENT DOCUMENTS

CN 103869817 6/2014
CN 103941750 7/2014
(Continued)

OTHER PUBLICATIONS

Machine Translation of Chinese Patent Pub. No. CN108100243A to Shenzhen Autel.*
(Continued)

*Primary Examiner* — Jean Paul Cass

(57) ABSTRACT

An aerial vehicle including a central frame electro-mechanically connected to a central frame inertial measurement unit (IMU) adapted to output central frame inertial measurements to one or more controllers. A motor frame includes a central rod mounted in perpendicular to a longitudinal axis of the central frame, and a pair of lateral arms each fixated to a different end of the central rod in parallel to the longitudinal axis of the central frame. A motor frame IMU adapted to output motor frame inertial measurements of the motor frame to the flight controller. The central frame is further electro-mechanically connected to the one or more controllers adapted to calculate control signals for rotating the central frame according to the central frame inertial measurements and the central rod inertial measurements. A stabilizing motor adapted to rotate the central frame according to the control signals.

19 Claims, 8 Drawing Sheets

(51) Int. Cl.
    *B64U 30/297*      (2023.01)
    *B64U 60/50*        (2023.01)
    *G05D 1/495*       (2024.01)

(56)           References Cited

U.S. PATENT DOCUMENTS

| | | | | |
|---|---|---|---|---|
| 10,293,932 | B2 * | 5/2019 | Alzahrani | B64U 30/12 |
| 11,447,261 | B2 * | 9/2022 | Peloquin | B64U 70/80 |
| 12,072,704 | B2 * | 8/2024 | Qu | G05D 1/0016 |
| 12,145,753 | B2 * | 11/2024 | Bitar | B64U 50/14 |
| 2012/0261523 | A1 | 10/2012 | Shaw | |
| 2014/0061376 | A1 | 3/2014 | Fisher et al. | |
| 2016/0370404 | A1 | 12/2016 | Quadrat et al. | |
| 2017/0193707 | A1 * | 7/2017 | Seiler | B64D 31/06 |
| 2018/0035606 | A1 * | 2/2018 | Burdoucci | A01D 34/008 |
| 2018/0231970 | A1 * | 8/2018 | Qu | G05D 1/0016 |
| 2018/0354622 | A1 * | 12/2018 | Raffler | G05D 1/0808 |
| 2019/0061941 | A1 * | 2/2019 | Zhang | B64U 10/13 |
| 2020/0277055 | A1 | 9/2020 | Suzuki | |
| 2021/0107652 | A1 * | 4/2021 | Velazquez | B64C 29/0033 |
| 2021/0124373 | A1 * | 4/2021 | Miller | B64C 17/02 |
| 2023/0150625 | A1 * | 5/2023 | Moses | B64U 80/84 244/17.23 |
| 2023/0406551 | A1 * | 12/2023 | Dao | B64U 10/13 |

FOREIGN PATENT DOCUMENTS

| | | | | |
|---|---|---|---|---|
| CN | 108100243 | | 6/2018 | |
| CN | 108100243 | A * | 6/2018 | B64C 27/08 |
| DE | 102008025607 | | 12/2009 | |
| EP | 3269641 | | 1/2018 | |
| FR | 3041931 | | 4/2017 | |
| JP | 2019209735 | A * | 12/2019 | B64C 25/36 |
| WO | WO 2011/081683 | | 7/2011 | |
| WO | WO 2022/157778 | | 7/2022 | |

OTHER PUBLICATIONS

International Preliminary Report on Patentability Dated Aug. 3, 2023 From the International Bureau of WIPO Re. Application No. PCT/IL2022/050093 (7 Pages).

International Search Report and the Written Opinion Dated Apr. 5, 2022 From the International Searching Authority Re. Application No. PCT/IL2022/050093. (10 Pages).

Office Action Dated Jul. 23, 2025 From the Israel Patent Office Re. Application No. 304575. (3 Pages).

* cited by examiner

501
Connect a central rod of the motor frame
through the central body (fuselage)
perpendicular to a longitudinal axis of the central
body.

503
Measure the inertia of the central body and the
central rod with respective inertial measurement
units (IMUs).

505
Calculate control signals for a flight process of
the aerial vehicle based on the measured inertias
of the central body and the central rod.

507
Rotate the central rod with a stabilizing motor,
according to the control signals.

DYNAMIC DRIVE

RELATED APPLICATIONS

This application is a National Phase of PCT Patent Application No. PCT/IL2022/050093 having International filing date of Jan. 21, 2022, which claims the benefit of priority under 35 USC § 119(e) of U.S. Provisional Patent Application No. 63/139,853 filed on Jan. 21, 2021. The contents of the above applications are all incorporated by reference as if fully set forth herein in their entirety

BACKGROUND

The present disclosure, in some embodiments of the present disclosure thereof, relates to an aerial vehicle. More specifically to an optimization of a flight process in terms of adaptive aerodynamics. The adaptive aerodynamics to improve, flight stability, energy consumption, increased velocity and reduced drag for the aerial vehicle, but not exclusively, to unmanned aerial vehicles.

SUMMARY

It is an object of the present invention to provide an apparatus, a system, a computer program product, and a method for an aerial vehicle. More specifically to an optimization of a flight process in terms of adaptive aerodynamics. The adaptive aerodynamics applied as a dynamic drive between a motor frame and a central frame of the aerial vehicle to improve, flight stability, energy consumption, increased velocity and reduced drag for the aerial vehicle, but not exclusively, to unmanned aerial vehicles.

For brevity, the term fuselage and central frame may be referred to herein interchangeably.

An aerial vehicle including a central frame electro-mechanically connected to a central frame inertial measurement unit (IMU) adapted to output central frame inertial measurements to one or more controllers. A motor frame includes a central rod mounted in perpendicular to a longitudinal axis of the central frame, and a pair of lateral arms each fixated to a different end of the central rod in parallel to the longitudinal axis of the central frame. A motor frame IMU adapted to output motor frame inertial measurements of the motor frame to the flight controller. The central frame is further electro-mechanically connected to the one or more controllers adapted to calculate control signals for rotating the central frame according to the central frame inertial measurements. A stabilizing motor adapted to rotate the central frame according to the control signals. The controllers may be a flight controller and a gimbal controller. The rotation of the central frame under control of the gimbal controller maintains a steady angle of pitch of the central frame.

Each of central frame IMU and the motor frame IMU are utilized separately to detect changes in the axes of pitch, roll and yaw of the central frame and the motor frame respectively. The changes are conveyed to the gimbal controller and the flight controller respectively. A pitch angle of the central frame in the axes relative to the horizon is with respect to control signals from the gimbal controller applied to the stabilizing motor. Each lateral arm includes a rotor where the axis of rotation is perpendicular to the longitudinal axis. The central frame is aerodynamic. A rotation of central rod provides an adjustment of an attack angle of the motor frame in relation to the central frame. The adjustment of the attack angle of the motor frame relative to a horizon may be without a substantial increase of drag when the central frame is parallel to the horizon. The central frame contains a main power board, the flight controller, the gimbal controller, a first person view camera, a video transmitter module and one or more flight batteries. The motor frame may be H shaped.

A method for an optimization of a flight process for an aerial vehicle that includes a motor frame and a central frame. A central rod of the motor frame is mechanically connected through the central frame perpendicular to a longitudinal axis of the central frame. In a flight mode of the aerial vehicle, the inertia of the central frame is measured and the motor frame with a central frame inertial measurement unit (IMU) and a motor frame IMU respectively. In the flight mode, control signals for the flight process of the aerial vehicle are calculated based on the inertial measurements made by the motor frame IMU. The central frame is rotated with a stabilizing motor, according to outputs of the central frame IMU.

The flight mode of the aerial vehicle may be hovering in a static position, moving upwards or downwards, moving forwards or backwards, moving left and right, moving left and right in the static position, moving left and right while moving upwards or downwards, moving left and right while moving forwards or backwards.

The method may further include enabling a constant pitch angle difference between the central frame and the motor frame with respect to the longitudinal axis. During the enabling and while transitioning from the flight mode to another flight mode, maintaining an orientation of the center body with respect to the horizon. The maintaining provides a single gimbal function to the center frame at a single central point of the center frame. In the flight mode, selecting a desired velocity and maneuver of the aerial vehicle without a substantial increase of the drag imposed by the center body in the direction of travel of the aerial vehicle.

A pair of lateral arms are each fixated to a different end of the central rod. The pair of lateral arms are in parallel to the longitudinal axis of the central frame. Each lateral arm includes at least one motor and a rotor. The axis of rotation of the rotor is perpendicular to the longitudinal axis.

Changes in the axes of pitch, roll and yaw of the central frame and motor frame may be detected with the central frame inertial measurement unit IMU and a motor frame IMU respectively. The changes may be conveyed to a gimbal controller and a flight controller respectively. The levelling of the central frame in the axes is with respect to control signals from the gimbal controller to the stabilizing motor. The central frame is aerodynamic.

The adjustment of the attack angle of the motor frame relative to a horizon may be without a substantial increase of drag when the central frame is parallel to the horizon.

The central frame contains a main power board, the flight controller, the gimbal controller, a first person view camera, a video transmitter module and one or more flight batteries.

According to a first aspect, an adaptive aerodynamic efficient design of the aerial vehicle that gives longer flight endurance, higher flight speed and increased efficiency of the flight controller and is less resistant to wind. The adaptive aerodynamics efficient design applied as a dynamic drive mechanism between a motor frame and a central frame of the aerial vehicle to improve, flight stability, energy consumption, increased velocity and reduced drag for the aerial vehicle.

According to a second aspect, a stabilized center body or frame that can carry optics and complementary payloads that need to be stabilized and controlled. Examples of the complementary payloads include a flashlight for search and rescue, a laser pointer for target indication used in combat fire adjustment.

According to a third aspect, the aerial vehicle provides descent and ascent in a rapid manner and high speed acceleration.

According to a fourth aspect, the aerial vehicle provides a platform that is comprised of a motor frame and a center frame combined with a stabilizing motor to create an integrated platform that can carry various payloads while keeping the payloads stable. The stabilizing motor connected between the motor frame and the center frame provides in-flight dynamic adjustment and stabilization of the center frame, to keep it horizontal with respect to the horizon, or at any other desired orientation as required by flight control and mission performance.

The foregoing and other objects are achieved by the features of the independent claims. Further implementation forms are apparent from the dependent claims, the description and the figures.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the present disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 5 shows a flowchart of a method for an optimization of a flight process for aerial vehicle 10, in accordance with some embodiments of the present disclosure;

4

Figure 7:
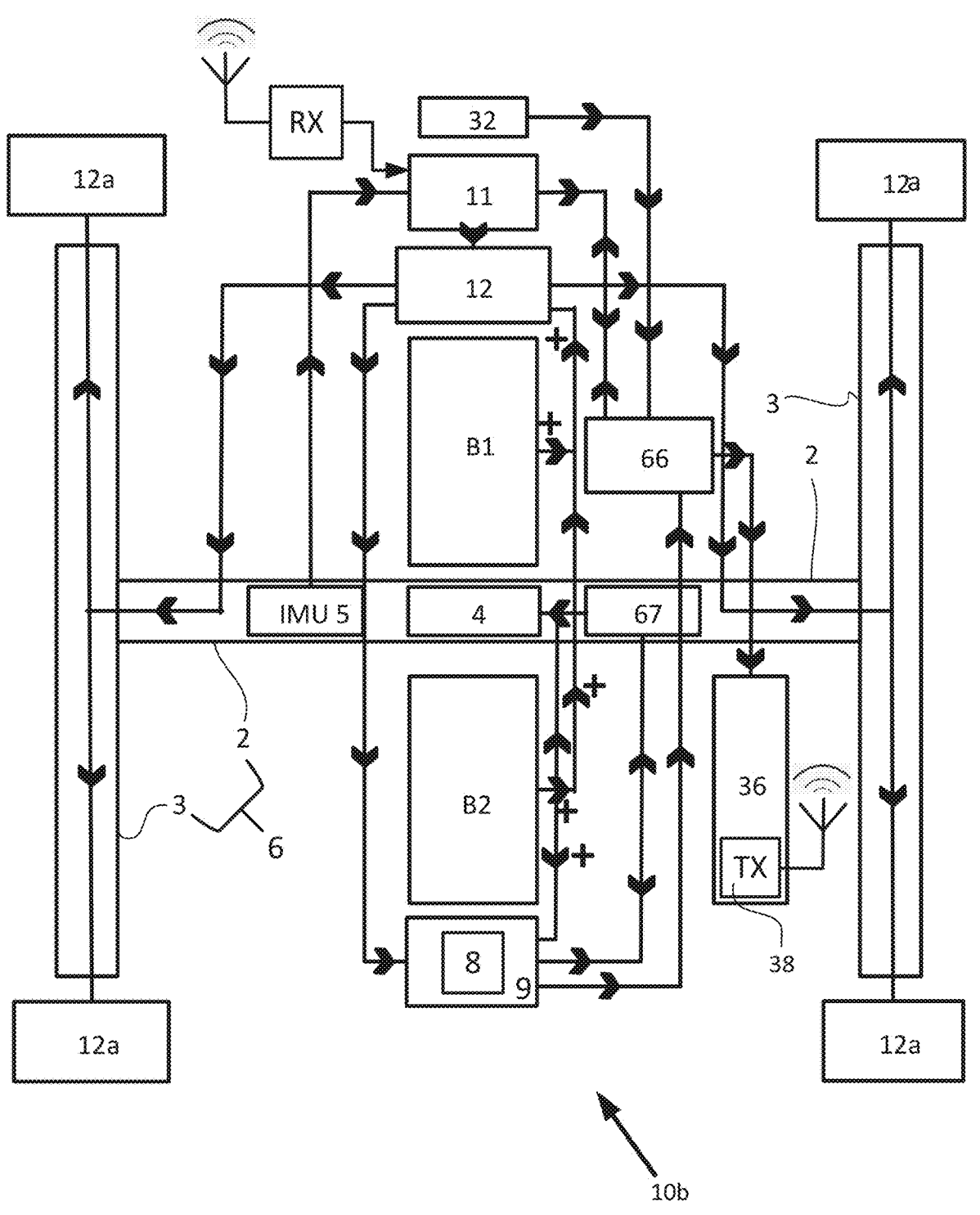
Figure 8:
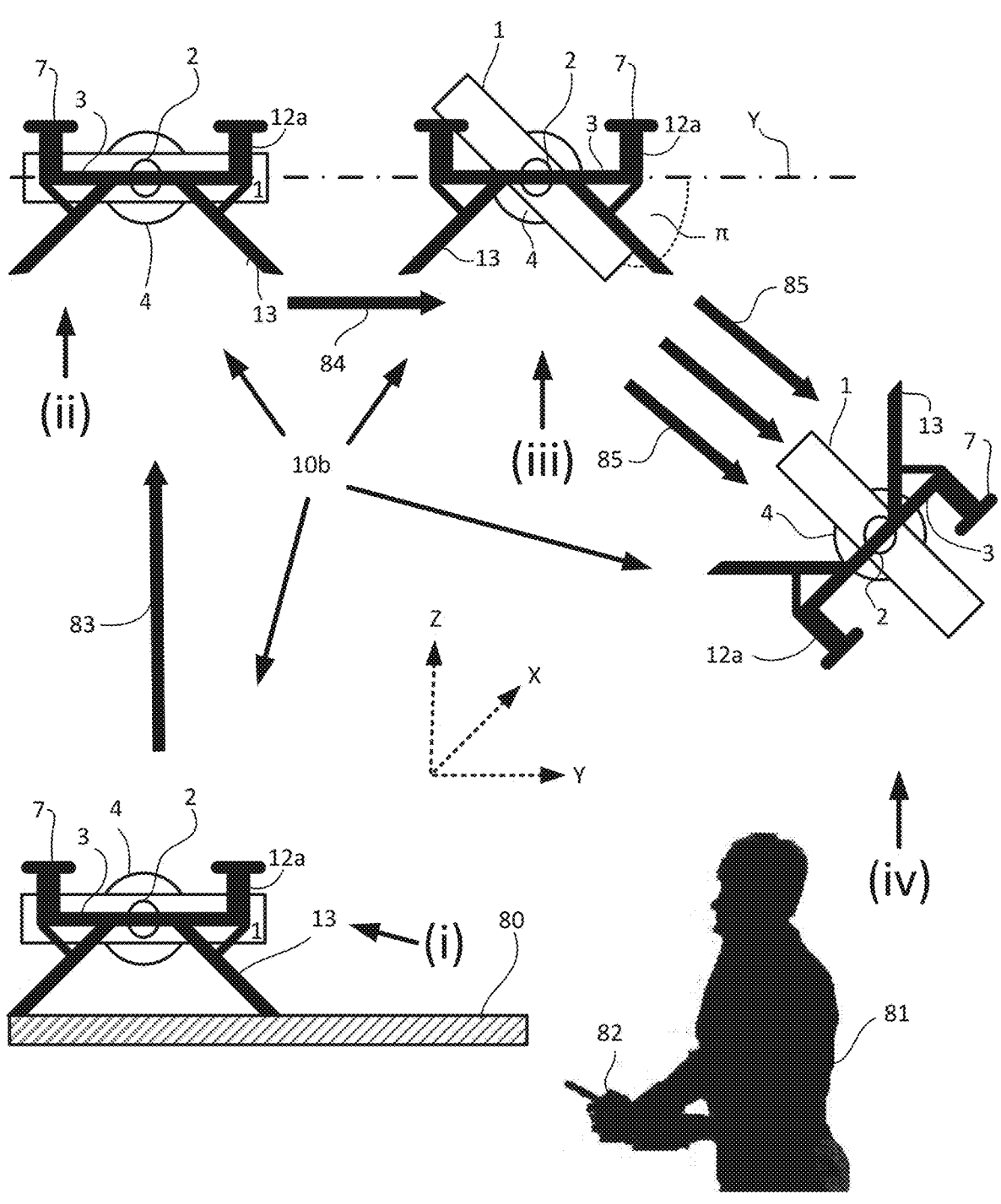
Figure 9:
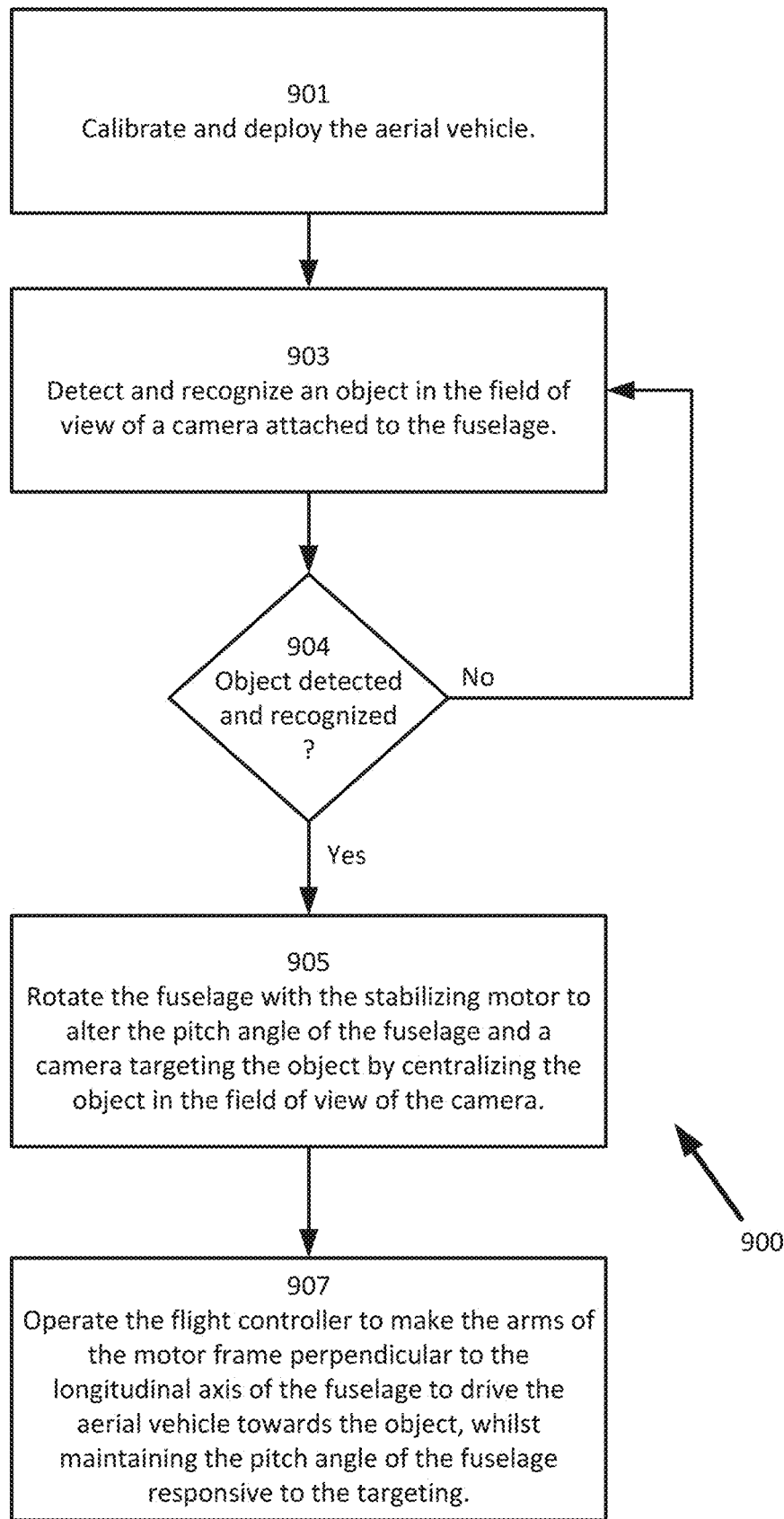

FIG. 7 shows a system block diagram of an aerial vehicle, in accordance with some embodiments of the present disclosure; and FIG. 8 and FIG. 9, show a side view of a flight maneuver of an aerial vehicle and a flow chart of a method to enable the flight maneuver of the aerial vehicle, in accordance with some embodiments of the present disclosure.

DETAILED DESCRIPTION

The present disclosure, in some embodiments thereof, relates to an aerial vehicle. More specifically to an optimization of a flight process in terms of adaptive aerodynamics. The adaptive aerodynamics applied as a dynamic drive between a motor frame and a central frame of the aerial vehicle to improve, flight stability, energy consumption, increased velocity and reduced drag for the aerial vehicle, but not exclusively, to unmanned aerial vehicles.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By way of introduction aspects of the disclosure below, describe an aerial vehicle that comprises two distinct bodies or frames, a motor frame and a center frame, instead of a fixed single frame body. A longitudinal axis is common to both the two arms of the motor frame and the center frame is perpendicular to a central rod. The central rod passes through and is rotationally attached to a stabilizing motor located in the center frame. The central rod passes laterally through either side of the center frame and the two respective ends of the central rod attach perpendicular to the two arms of the motor frame. A motor frame inertial measurement unit (IMU) located on the motor frame, is operationally attached to a flight controller to detect and measure changes in pitch, roll and yaw of the motor frame. In accordance to a flight plan the flight controller, the motor frame IMU also measures acceleration, orientation, angular rates, and other gravitational forces for the motor frame. The flight plan may be according to the speed, height, a heading towards a particular location via global positioning system (GPS) integrated with the flight controller. Where for example, the camera may be used for reconnaissance purposes. The reconnaissance purposes may be whilst the aerial vehicle is moving or is stationary.

A gimbal controller electrically connected to the stabilizing motor is operationally attached to a center frame IMU located in the center frame to make inertial measurements of the center frame. The center frame IMU also measures acceleration, orientation, angular rates, and other gravitational forces for the center frame A primarily function of the gimbal controller, is to provide an in-flight dynamic adjustment of the center frame. The in-flight dynamic adjustment includes the gimbal controller calculating control signals to rotate the central rod via the stabilizing motor according to the central frame inertial measurements and the motor frame inertial measurements. The in-flight dynamic adjustment enables a constant pitch angle difference between central frame and the motor frame with respect to the longitudinal axis whilst maintaining the center frame horizontal and/or at any other desired orientation with respect to a ground surface.

In a deployment of the aerial vehicle, a stabilizing motor is utilized under the control of a gimbal controller. The center frame is rotated to provide an adjustment of the pitch angle of zero degrees between center frame and the motor frame, whilst maintaining the center frame in a horizontal position relative to the horizon in a flying mode of the aerial vehicle. Whereas to maintain certain levels of roll and yaw levels of center frame, a flight controller controls the rotation speeds of the motors via an electronic speed controller (ESC). At launch the aerial vehicle stands on a calibrated leveled surface or a launch pad. The launch pad placed on the ground to enable a possible calibration of the horizontal position of both the center frame and the motor frame at this point other than the one made in the factory, may be made by the user.

The in-flight dynamic adjustment may be with respect to an attack angle of motor frame relative to a horizon, to obtain desired velocities and/or maneuvers without or almost without an increase of the drag imposed by the center frame. The increase of the drag imposed by the center frame may be relative to being more than the minimum drag imposed when the center frame is parallel to the horizon.

Figure 1:
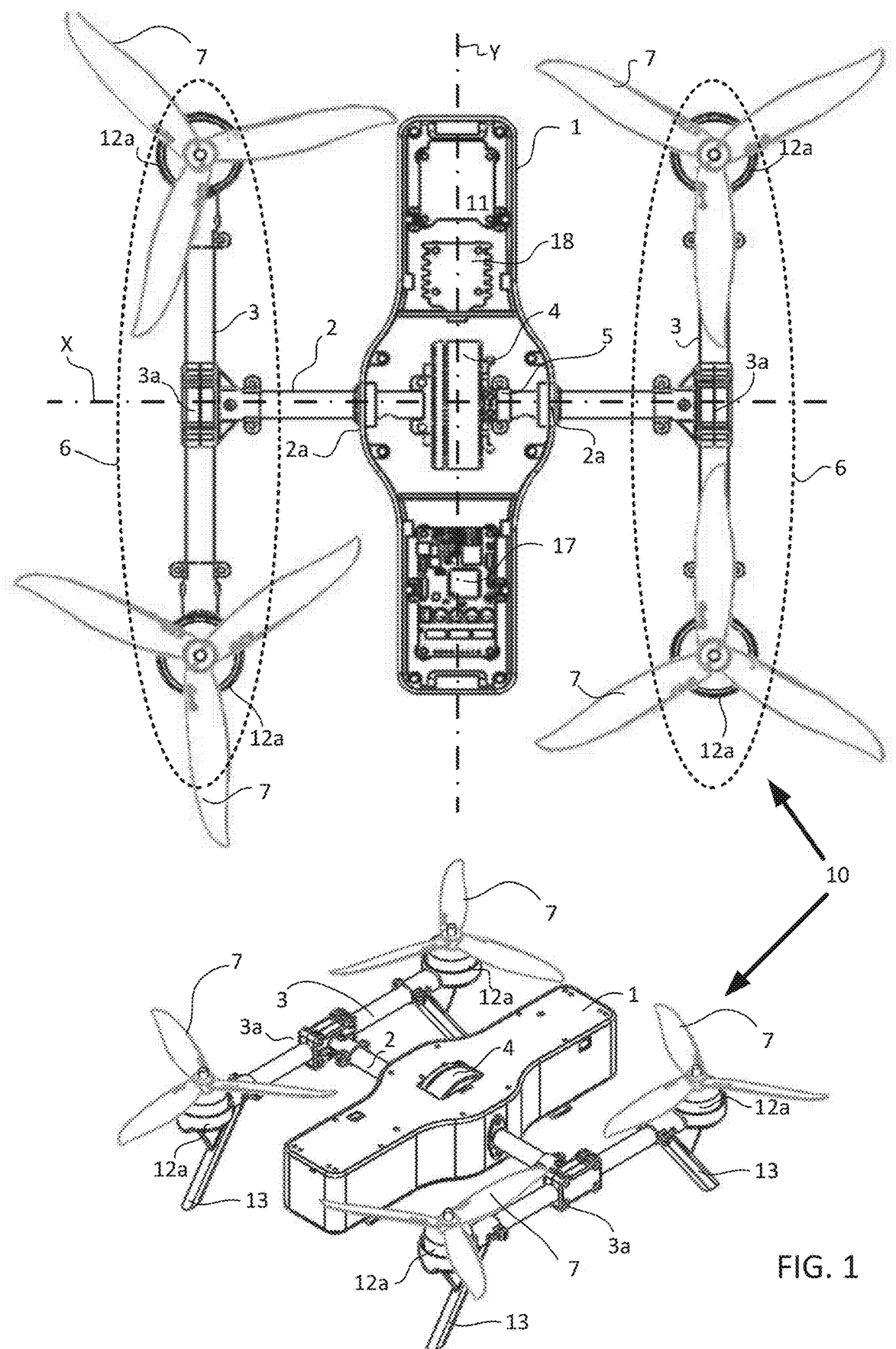
FIG. 1 shows a plan view and a perspective view of an aerial vehicle, in accordance with some embodiments of the present disclosure.

Reference is now made to FIG. 1, which shows a plan view and a perspective view of an aerial vehicle 10, in accordance with some embodiments of the present disclosure. In the plan view, a central rod 2 passes through bearings 2a located in the sides of central frame 1 a central frame 1. Central rod 2 also passes through and is rotationally attached to a rotor that is the dynamic part of stabilizing motor 4. Stabilizing motor 4 may be implemented as a brushless motor. A motor frame inertial measurement unit (IMU) 5 is attached to the rotor of stabilizing motor 4. The center of balance of central frame 1 is indicated by horizontal axis X through which central rod 2, bearings 2a and stabilizing motor 4 are located. The armature frame of stabilizing motor 4 is mechanically and centrally attached to the floor and ceiling of central frame 1 with respect to horizontal axis X and vertical axis Y. Central rod 2 is rotated by stabilizing motor 4 and central rod 2 rotates around bearings 2a located in the sides of central frame 1. Central rod 2 attaches perpendicular to two arms 3 by T-junctions 3a. Arms 3 are in parallel with vertical axis Y. At the four ends of arms 3 are four motors 12a with rotors 7. The axis of rotation of rotors 7 is perpendicular to arms 3. Arms 3, T-junctions 3a and central rod 2 form the basis for a firm structure that is H shaped motor frame 6 (indicated by two dashed ellipses). The firm structure may also be formed from a single material such as from an injection-molded piece or in composite layers of carbon fiber for example.

In both the perspective view and the plan view, connected to the underside of arms 3 at the location of motors 12a are four landing legs 13. Central frame 1 may be an aerodynamic frame that is sized and shaped to contain a module 18 that includes a main power board (not shown) an electric speed controller (ESC). A circuit module 17 that includes a gimbal controller (not shown) for stabilizing motor 4 attached to the floor of central frame 1 and a central frame inertial measurement unit (not shown) which is both mechanically and electrically attached to circuit module 17. The gimbal controller operates to provide a stabilization of the rotation of central frame 1 relative to the rotation of motor frame 6. The stabilization maintains the pitch angle of central frame 1 constant relative to the horizon so that stabilizing motor 4 provides a gimbal function to central frame 1. Central frame 1 may further include a flight controller 11, a first-person view camera (not shown), a video transmitter (not shown) module and one or more flight batteries (not shown).

The one or more flight batteries connected to the main power board provide power required by stabilizing motor 4, motors 12a, the first person view camera, the video transmitter module and the gimbal controllers over power lines. The gimbal controllers include flight controller 11 and the gimbal controller operably attached to control stabilizing motor 4. According to some embodiments, where the control units are operated separately from each, may allow a replacement of flight controller 11 with an off the shelve flight controller. The video transmitter module transmits video and sound data to a remote controller used by an operator of aerial vehicle 10 and/or to the cloud via a smart phone for example. Control signals from the gimbal controllers to stabilizing motor 4, motors 12a, the first person view camera, the video transmitter module and the gimbal controllers may be via power line communication over the power lines, radio frequency (RF) signals, cellular communication lines or by fiber optical cables. The power lines interconnect electrically the various components of aerial vehicle 10 to each other and to the main power board.

In a calibration and subsequent deployment enabling stabilizing motor 4 under the control of gimbal controller 9 specifically, central frame 1 is rotated to provide an adjustment of the pitch angle of zero degrees between central frame 1 and motor frame 6, whilst maintaining central frame 1 in a horizontal position relative to the horizon in a flying mode of aerial vehicle 10. The calibration of the pitch angle of zero degrees is factory set or may be re-calibrated by a user. Whereas to maintain certain levels of roll and yaw levels of central frame 1, flight controller 11 controls the rotation speeds of motors 12a via the electronic speed controller (ESC). In the calibration, the horizontal position of both central frame 1 and motor frame 6 is calibrated by aerial vehicle 10 standing on level surface or launch pad in the XY plane.

Figure 2:
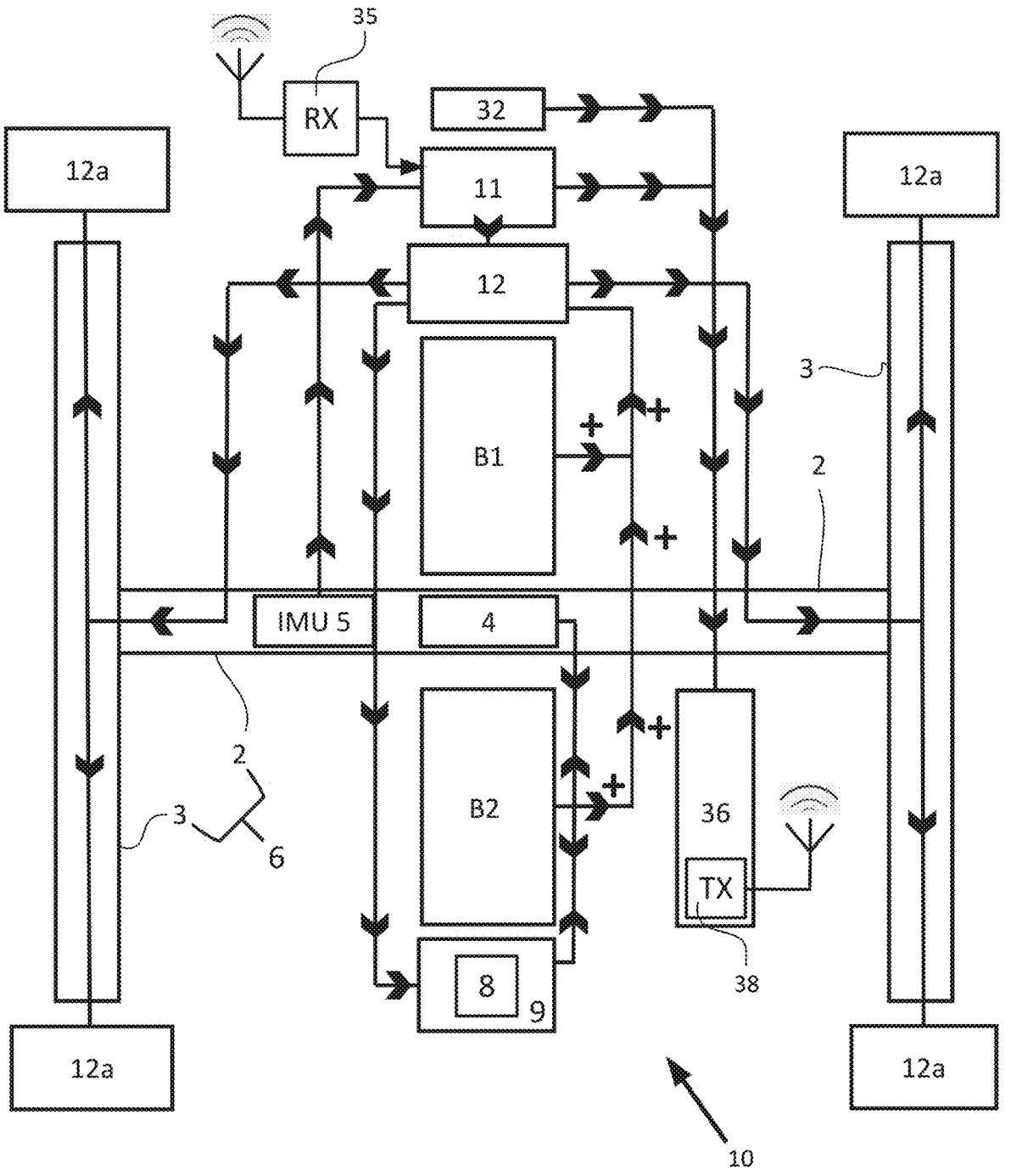
FIG. 2 shows a system block diagram of aerial vehicle, in accordance with some embodiments of the present disclosure.

Reference is now made to FIG. 2, which shows a system block diagram of aerial vehicle 10, in accordance with some embodiments of the present disclosure. Located in central frame 1 is a gimbal controller 9 that includes a central frame inertial measurement unit (IMU) 8. There are different types of IMUs to implement central frame IMU 8 that may include IMUs based on a Fiber Optic Gyroscope (FOG), a Ring Laser Gyroscope (RLG), and IMUs based on Micro Electro-Mechanical Systems (MEMS) technology. Both gimbal controller 9 and central frame IMU 8 are mechanically attached to central frame 1. A rotary encoder (not shown) may also be attached to stabilizing motor 4 to provide an estimation of angular displacement between longitudinal axis of central frame 1 and arms 3. Central frame IMU 8 is placed and is mechanically attached to the floor of central frame 1 to provide inertial measurements of central frame 1. The inertial measurements of central frame 1 provide an in-flight dynamic adjustment. The in-flight dynamic adjustment includes gimbal controller 9 calculating control signals to rotate central frame 1 around central rod 2 via stabilizing motor 4 according to central frame 1 inertial measurements. Central frame 1 is optionally an aerodynamic frame that is sized and shaped to contain a main power board (PDB) included in electronic speed controller (ESC) 12.

Further included is a flight controller 11, a first person view camera (FPV CAM) included in optic module 32 that may also include a flashlight for search and rescue or a laser pointer for target indication used in combat fire adjustment. A video transmitter (TX) module 38 included in a communication control unit (CCU) 36, motor 4 and flight batteries B1 and B2 located either side of center rod 2. Flight batteries B1 and B2, electrically connect to the main power board (PDB) included in electronic speed controller (ESC) 12. Arrows including with a plus (+) sign indicate specifically the flow of positive current from batteries B1 and B2 to the main power board (PDB) included in electronic speed controller (ESC) 12. Arrows specifically for the flow of negative current to batteries B1 and B2 from the main power board (PDB) included in electronic speed controller (ESC) 12 are not shown for the sake of simplifying the drawing. The other arrows indicate the flow of data and/or the flow of positive current from the main power board (PDB) to provide power required by stabilizing motor 4, motors 12a, the first person view camera, the video transmitter module and the gimbal controllers over power lines. The video transmitter (TX) module included in CCU 36 transmits the video images for the FPV CAM and other data. The other data may include for example telemetry data like motor RPM, battery voltage, altitude, direction, flight mode, and more flight information.

Stabilizing motor 4 is controlled by a pitch control signal, derived from measurements made directly by central frame IMU 8 to maintain a certain level of pitch of central frame 1. Whereas to maintain certain levels of roll and yaw levels of central frame 1, flight controller 11 controls the rotation speeds of motors 12a via electronic speed controller (ESC) 12, from measurements made from motor frame IMU 5 in the flight modes.

Motor frame IMU 5 is located and attached to motor frame 6 by attaching to the rotor which is the dynamic part of stabilizing motor 4. Frame 6 includes central rod 2, arms 3, T-junctions 3a (not shown), motors 12a and rotors 7. Motor frame IMU 5 measures roll, pitch and yaw of motor frame 6 that is inputted into flight controller 11. Motor frame IMU 5 may be based on a Rotary Encoder, Fiber Optic Gyroscope (FOG), a Ring Laser Gyroscope (RLG), or Micro Electro-Mechanical Systems (MEMS) technology. Flight controller 11 may be implemented as a micro-controller and/or digital signal processor (DSP). Flight instructions from a remote control device operated by the user, may be received by receiver (RX) 35 which is connected to flight controller 11. Control signals are conveyed from flight controller 11 to electronic speed controller (ESC) 12. ESC 12 determines the speed and rotational directions of each motor 12a according to measurements of motor frame IMU 5. The speed and direction of rotation of each motor 12a determines the flight modes of aerial vehicle 10 including causing aerial vehicle 10 to go up or down, hover in one position, move forwards or backwards and turn left or right, or in a combination of modes. The combination of modes may include for example, moving aerial vehicle 10 forwards whilst going up at the same time for example.

Figure 3:
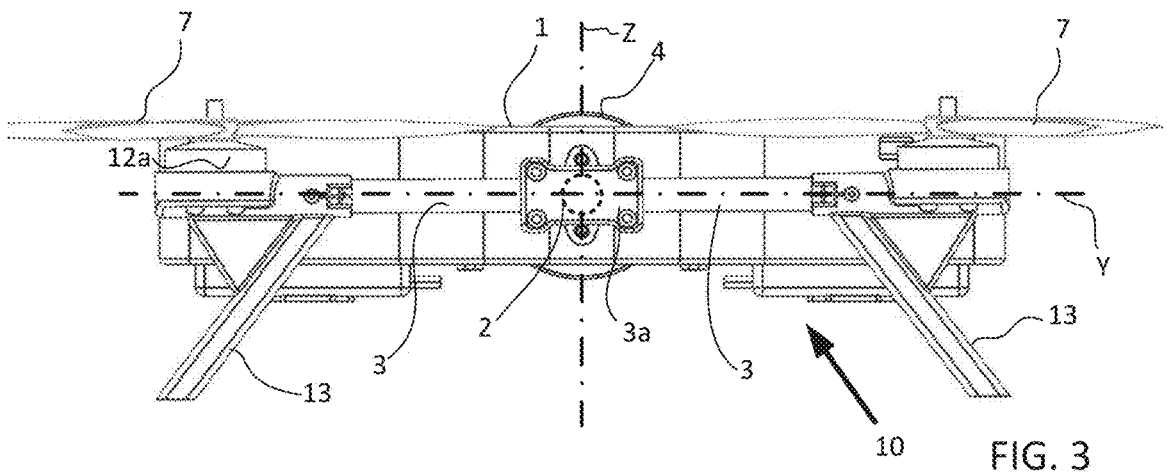
FIG. 3 shows a side view of a flight mode of aerial vehicle in accordance with some embodiments of the present disclosure.

Reference is now made to FIG. 3, which shows a side view of a flight mode of aerial vehicle 10, in accordance with some embodiments of the present disclosure. The flight mode shows frame 6 that includes central rod 2, arms 3, T-junctions 3a, motors 12a and rotors 7 aligned in parallel with central frame 1 along longitudinal Y-axis perpendicular to the Z-axis. The flight mode may represent a hovering mode of aerial vehicle 10 or aerial vehicle 10 to fly upwards or downwards to land aerial vehicle 10 on the ground by use of four landing legs 13. In hovering or flying upwards or downwards, stabilizing motor 4 under the control of gimbal controller 9, rotates central frame 1 to provide an adjustment of the pitch angle of zero degrees between central frame 1 and motor frame 6, whilst maintaining central frame 1 in a horizontal position with respect to the horizon. In hovering or flying upwards or downwards, stabilizing motor 4 under the control of gimbal controller 9 rotates central frame 1 to provide an adjustment of the pitch angle of central frame 1 derived from measurements made directly by central frame IMU 8 to maintain a certain level of pitch of central frame 1. Whereas to maintain certain levels of roll and yaw levels of central frame 1, flight controller 11 controls the rotation speeds of motors 12a and rotational direction of rotors 7 to adjust roll and yaw of central frame 1, based on measurements made from motor frame IMU in the flight modes.

Figure 4:
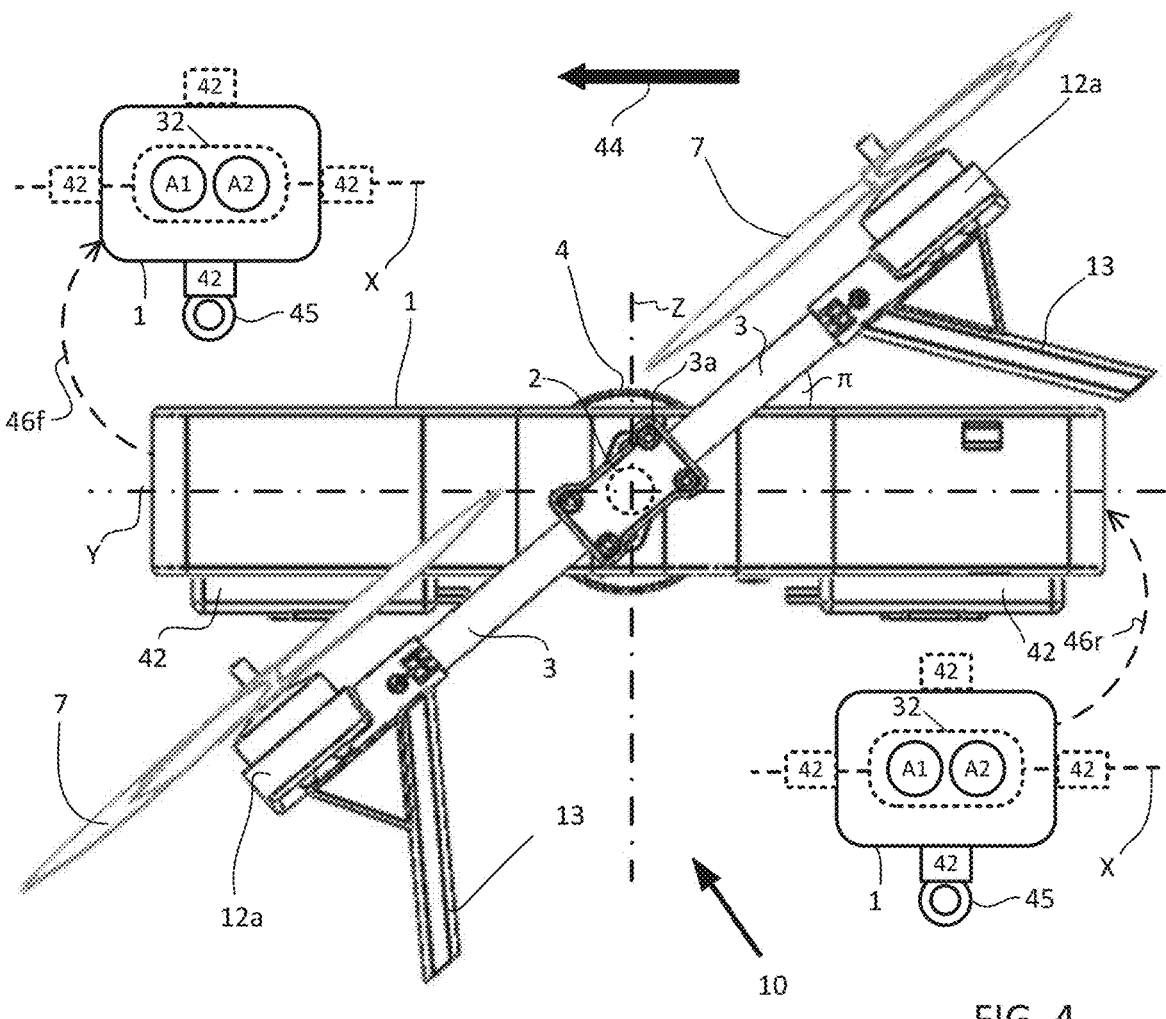
FIG. 4 shows a side view of another flight mode of aerial vehicle, in accordance with some embodiments of the present disclosure.

Reference is now made to FIG. 4, which shows a side view of another flight mode of aerial vehicle 10, in accordance with some embodiments of the present disclosure. The flight mode shows frame 6 that includes central rod 2, arms 3, T-junctions 3a, motors 12a and rotors 7 aligned so that arms 3 are tilted or pitched at an angle π relative to horizontal axis Y of central frame 1 about the central point of central rod 2/T-junctions 3a. Dashed line and arrow 46f shows a plan view of the front of central frame 1 with respect to the X-axis, where optic module 32 shown by dotted line is located in central frame 1. Two lenses or apertures A1 and A2 enable a forward field of view (FOV) in the direction of axis-Y for the first person view camera (FPV CAM) included in optic module 32. The other aperture may used for a flashlight for search and rescue in substantial same forward field of view as FPV CAM. Dashed line and arrow 46r shows a plan view of the rear of central frame 1 where another optic module 32 shown by dotted line is located in the rear of central frame 1. Central frame 1 includes rails 42 that may be mounted in the center of central frame 1 to the underneath of central frame 1, along in the same direction of axis-Y as the first person view camera (FPV CAM). Similarly, rails 42 may be mounted to the top of central frame 1 in the center of central frame 1, along in the same direction of axis-Y. Further, rails 42 that may be mounted to the respective sides of central frame 1 in the center of central frame 1, along in the same direction of axis-Y. Attachable to the rails are other attachable elements 45 that may include a gun barrel or a laser pointer for target indication. The direction of fire from the gun barrel or the direction of pointing of the laser pointer is the same direction as the axis-Y as FPV CAM and in substantial same forward field of view as FPV CAM.

In the flight mode, the four landing legs 13 are not utilized. The flight mode may be that of moving aerial vehicle 10 forward and upwards or forward and downwards for example. According to the flight mode, stabilizing motor 4 under the control of gimbal controller 9, rotates stabilizing motor 4 to adjust and maintain the pitch angle of central frame 1 in relation to that of motor frame 6 at angle π whilst maintaining central frame 1 in a horizontal position. Flight controller 11 controls the speeds of motors 12a and rotational direction of rotors 7 according to the flight plan of aerial vehicle 10 and with respect to and including the flight mode at a particular moment and place in time, primarily to maintain central frame 1 in a horizontal position. The adjustment of the attack angle of motor frame 6 to obtain desired velocities and/or maneuvers is without or almost without an increase of the drag imposed by central frame 1 to more than the minimum drag imposed when central frame 1 is parallel to the horizon.

Stabilizing motor 4, maintains the pitch angle of central frame 1 constant relative to the horizon so that stabilizing motor 4 provides a single gimbal function to central frame 1 at a single central point of central frame 1. The single central point adding to the stability of central frame 1 by virtue of the balancing benefit that the single central point provides. By virtue of the single gimbal function, items housed and attached to central frame 1, such as the first person view camera (FPV CAM), the flashlight, and the laser pointer included in optic module 32 and complementary payloads do not require further gimbal stabilizers for their control and stabilization Eliminating the need for further gimbal stabilizers further reduces costs and increased weight.

In aerial vehicle 10 flying forwards, as shown by arrow 44, stabilizing motor 4 under the control of gimbal controller 9 rotates central frame 1 to provide an adjustment of the pitch angle of central frame 1. The pitch angle of central frame 1 is parallel to the horizon. The rotation of central frame 1 is derived from measurements made directly by central frame IMU 8 to maintain a certain level of pitch of central frame 1. Whereas to maintain certain levels of roll and yaw levels of central frame 1, in addition to desired velocities and/or maneuvers of aerial vehicle 10. Flight controller 11 may control the rotation speeds of motors 12a to adjust roll and yaw of central frame 1, based on measurements made from motor frame IMU 5 in the flight modes.

Reference is now made to FIG. 5, which shows a flowchart of a method 500 for an optimization of a flight process for aerial vehicle 10, in accordance with some embodiments of the present disclosure. The flight process may include multiple flight modes of aerial vehicle 10. The flight modes include for example when aerial vehicle 10 is hovering in a static position, in the static position but moving upwards or downwards. In the static horizontal position but moving left and right in order to pan aerial vehicle 10. Aerial vehicle 10 moving forwards while moving left or right. Further, aerial vehicle 10 moving left or right while moving upwards or in any other combinations according to operation by a user or according to a flight plan or a combination thereof. The flight process further includes an adjustment of an attack angle of motor frame 6 in relation to central frame 1. The adjustment of the attack angle of motor frame 6 to obtain desired velocities and/or maneuvers of aerial vehicle 10. The flight process and its control is described further in the descriptions that follow.

Prior to the steps described below, in a calibration and subsequent deployment enabling stabilizing motor 4 under the control of gimbal controller 9 specifically. Central frame 1 is rotated to provide an adjustment of the pitch angle of zero degrees between central frame 1 and motor frame 6, whilst maintaining central frame 1 in a horizontal position relative to the horizon in a flying mode of aerial vehicle 10. Whereas to maintain certain levels of roll and yaw levels of central frame 1, flight controller 11 controls the rotation speeds of motors 12a via electronic speed controller (ESC) 12. In the calibration, the horizontal position of both central frame 1 and motor frame 6 is calibrated by aerial vehicle 10 standing on a level surface or a launch pad in the XY plane.

At step 501, with reference to the drawings and in the descriptions above, central rod 2 of motor frame 6 passes through central frame 1 perpendicular longitudinal axis Y of central frame 1. In particular, central rod 2 passes through bearings 2a located in the sides of a central frame 1, a central frame 1. Central rod 2 also passes through and is rotationally attached to the rotor of stabilizing motor 4. The center of balance of central frame 1 is indicated by horizontal axis X through which central rod 2, bearings 2a and stabilizing motor 4 are located. The armature frame of stabilizing motor 4 is mechanically and centrally attached to the floor and/or ceiling of central frame 1 with respect to horizontal axis X and vertical axis Y. Central rod 2 is rotated by stabilizing motor 4 and central rod 2 rotates around bearings 2a located in the sides of central frame 1. Central rod 2 attaches perpendicular to two arms 3 by T-junctions 3a. Arms 3 are in parallel with vertical axis Y. At the four ends of arms 3 are four motors 12a with rotors 7. The axis of rotation of rotors 7 is perpendicular to arms 3. Frame 6 includes arms 3, T-junctions 3a and central rod 2 to form the basis for a firm structure that is H shaped motor frame 6 as shown in FIG. 1 and FIG. 2. The firm structure may also be implemented as being formed from a single material such as from an injection-molded piece or in composite layers of carbon fiber for example.

At step 503, prior to and in the process of the flight processes and flight modes described above. The inertias of central frame 1 and central rod 2 of motor frame 6 are measured with respective inertial measurement units (IMUs), central frame IMU 8 and motor frame IMU 5. Central frame IMU 8 is operably attached and located in central frame 1. Motor frame IMU 5 is attached to motor frame 6 and located by attachment to the stator of stabilizing motor 4. The inertias measured by motor frame IMU 5 are passed to flight controller 11. The inertias measured by central frame IMU 8 are passed to gimbal controller 9.

At step 505, control signals for a flight process of aerial vehicle are calculated according to an algorithm based on the measured inertias of central frame 1 and the central rod 2 at step 503. Stabilizing motor 4 is controlled by pitch 34 control signal, derived from measurements made by central frame IMU 8 to maintain a certain level of pitch of central frame 1. Whereas to maintain certain levels of roll and yaw levels of central frame 1, flight controller 11 controls the rotation speeds of motors 12a, based on measurements made from motor frame IMU 5 in the flight modes. The flight modes of aerial vehicle 10 may include causing aerial vehicle 10 to go up or down, hover in one position, move forwards or backwards or turn left or right.

With reference again to FIG. 3, the flight mode shows frame 6 that includes central rod 2, arms 3, T-junctions 3a, motors 12a and rotors 7 aligned in parallel with central frame 1 along longitudinal Y-axis perpendicular to the Z-axis. The flight mode may represent a hovering mode of aerial vehicle 10 or aerial vehicle 10 to fly upwards or downwards to land aerial vehicle 10 on the ground by use of four landing legs 13. In hovering or flying upwards or downwards, at step 507, stabilizing motor 4 under the control of gimbal controller 9, rotates central frame 1 to provide an adjustment of the pitch angle of zero degrees between central frame 1 and motor frame 6, whilst maintaining central frame 1 in a horizontal position relative to the horizon.

With reference again to FIG. 4, the flight mode shows frame 6 that includes central rod 2, arms 3, T-junctions 3a, motors 12a and rotors 7 aligned so that arms 3 are tilted or pitched at an angle π relative to horizontal axis Y of central frame 1 about central rod 2/T-junctions 3a. In the flight mode, the four landing legs 13 are not utilized. The flight mode may be that of moving aerial vehicle 10 forward and upwards or forward and downwards for example. According to the flight mode, at step 507, stabilizing motor 4 under the control of gimbal controller 9, to rotate central frame 1 and maintain the pitch angle of central frame 1 in relation to that of motor frame 6 at angle n whilst maintaining central frame 1 in a horizontal position relative to the horizon.

In hovering or flying upwards or downwards, stabilizing motor 4 under the control of gimbal controller 9 rotates central frame 1 to provide an adjustment of the pitch angle of central frame 1. The control signals calculated at step 505, derived from measurements made by central frame IMU 8 to maintain a certain level of pitch of central frame 1 is by controlled rotation of central frame 1 with stabilizing motor 4 at step 507. Whereas to maintain certain levels of roll and yaw levels of central frame 1, flight controller 11 controls the rotation speeds of motors 12a and rotational direction of rotors 7 to adjust roll and yaw of central frame 1, based from measurements made by motor frame IMU 5. Flight controller 11 controls the speeds of motors 12a and rotational direction of rotors 7 according to the flight plan of aerial vehicle 10 and with respect to and including the flight mode at a particular moment and place in time. Step 507 maintains central frame 1 at a certain angle of pitch relative to the horizon by controlled rotation of central frame 1 with stabilizing motor 4. The adjustment of the attack angle of motor frame 6 to obtain desired velocities and/or maneuvers is without or almost without an increase of the drag imposed by central frame 1 to more than the minimum drag imposed when central frame 1 is parallel to the horizon. Stabilizing motor 4 is controlled by gimbal controller 9 according to rotation instructions based on the inertial measurement of central frame inertial measurement unit (IMU) 8. Fuselage IMU 8 is placed in central frame 1 to provide inertial measurements of central frame 1. to provide an in-flight dynamic adjustment. The in-flight dynamic adjustment includes gimbal controller 9 calculating control signals to rotate central frame 1 via stabilizing motor 4 according to central frame 1 inertial measurements.

Therefore, according to aspects described above, an adaptive aerodynamic efficient design of aerial vehicle 10 that includes the rotation of central frame 1 about central rod 2, gives longer flight endurance, higher flight speed and increased efficiency of flight controller 11 and is less resistant to wind. The adaptive aerodynamics efficient design applied as a dynamic drive mechanism between motor frame 6 and a central frame 1 of aerial vehicle 10. The dynamic drive including stabilizing motor 4 to improve, flight stability, energy consumption, increased velocity and reduced drag for aerial vehicle 10. Consequently, stabilized central frame 1 can carry optics and complementary payloads that need to be stabilized and controlled. Examples of the complementary payloads include a flashlight for search and rescue, a laser pointer for target indication and in combat fire adjustment. Additionally aerial vehicle 10 by virtue of the dynamic drive provides descent and ascent in a rapid manner, high speed acceleration, is launchable from a plane with rapid descent, provides urban environment high speed maneuverability from outdoors to indoors and vice versa.

Figures 6A, 6B:
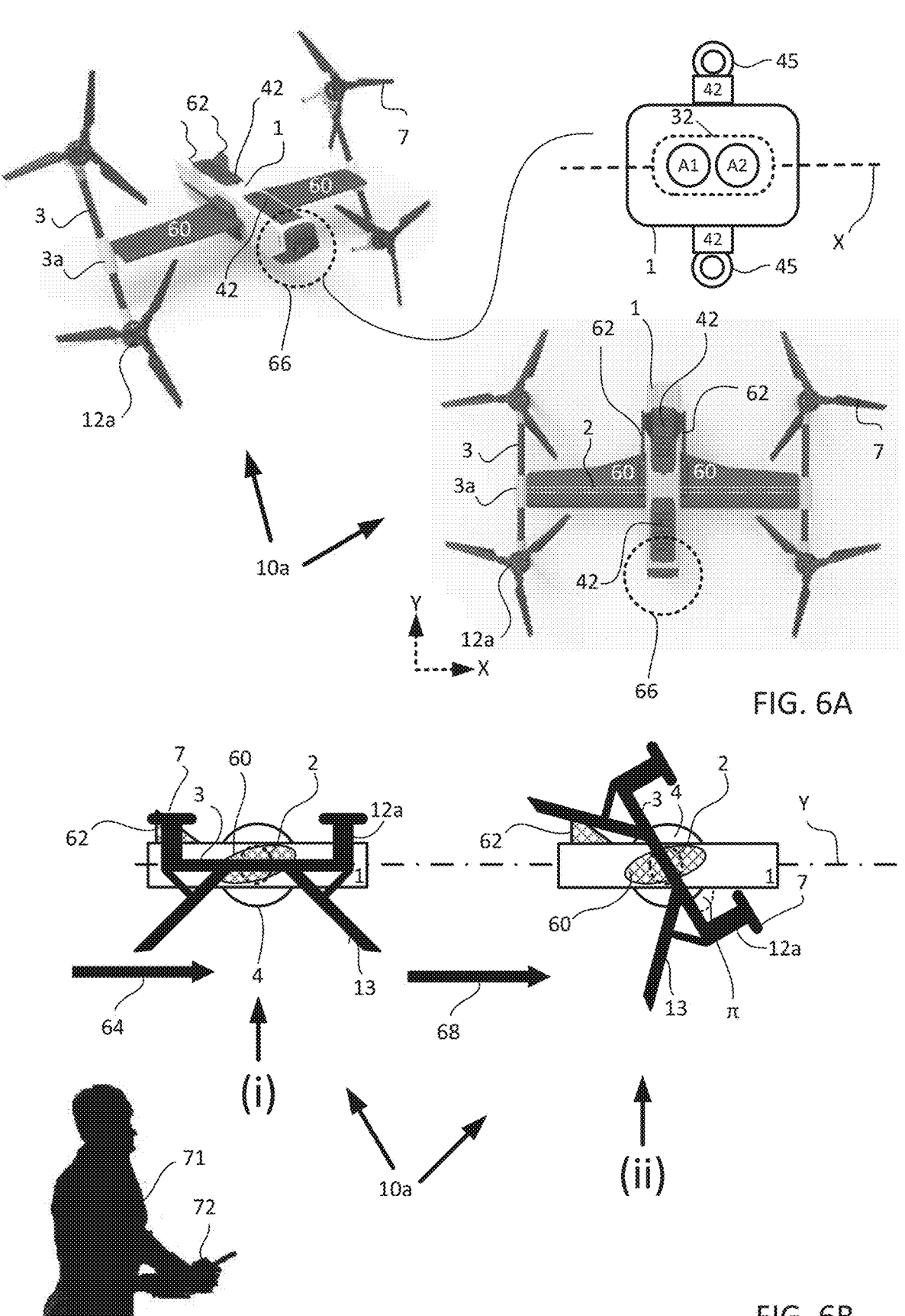
FIG. 6A shows a perspective view, a top plan view and a front plan view of an aerial vehicle, in accordance with some embodiments of the present disclosure.
FIG. 6B shows a side view of a flight maneuver of a fixed wing of an aerial vehicle, in accordance with some embodiments of the present disclosure.

Reference is now made to FIG. 6A, which shows a perspective view, a top plan view and a front plan view 66 of aerial vehicle 10a, in accordance with some embodiments of the present disclosure. In front plan view 66 with respect to the X-axis, where optic module 32 shown by dotted line is located in central frame 1. Two lenses or apertures A1 and A2 enable a forward field of view (FOV) in the direction of axis-Y for the first person view camera (FPV CAM) included in optic module 32. The other aperture may used for a flashlight (not shown) for search and rescue in substantial same forward field of view as FPV CAM. The rear of central frame 1 may also include another optic module (not shown) located in the rear of central frame 1.

Central frame 1 includes rails 42 that may be mounted to the underneath of central frame 1 in the center of central frame 1, along in the same direction of axis-Y as the first person view camera (FPV CAM). Similarly, rails 42 may be mounted to the top of central frame 1 in the center of central frame 1, along in the same direction of axis-Y. Attachable to forward rails 42 are other attachable elements 45 that may include a forward gun barrel (not shown) or a forward laser pointer (not shown) for target indication. The direction of fire from the forward gun barrel or the forward direction of pointing of a forward laser pointer is the same direction as the axis-Y as FPV CAM and is in substantial same forward field of view as a forward FPV CAM (not shown). Similarly, with respect to rearward elements 45 that may include a rearward gun barrel (not shown) or a rearward laser pointer (not shown) for target indication. The direction of fire from the rearward gun barrel or the rearward direction of pointing of the rearward laser pointer is the same direction as the axis-Y as FPV CAM and in substantial same rearward field of view as a rearward FPV CAM (not shown).

As with aerial vehicle 10, aerial vehicle 10a, stabilizing motor 4 (not shown) of aerial vehicle 10a provides a single gimbal function to central frame 1 at a single central point of central frame 1. The single central point adding to the stability of central frame 1 by virtue of the balancing benefit that the single central point provides. By virtue of the single gimbal function, items housed and attached to central frame 1 such as the first person view camera (FPV CAM), the flashlight, and the laser pointer included in optic module 32 and complementary payloads such as elements do not require further gimbal stabilizers for their control and stabilization Eliminating the need for further gimbal stabilizers further reduces costs and increased weight.

In the perspective view and the top plan view, a left and a right aerodynamic fixed wing 60 is attached to the respective left and right sides of central frame 1. The fixed wings 60 provide an aerodynamic lift in the forward movement of central frame 1. The armature frame of stabilizing motor 4 is mechanically and centrally attached to the floor and ceiling of central frame 1 with respect to horizontal axis X and vertical axis Y. Central rod 2 is rotated by stabilizing motor 4 and central rod 2 rotates around bearings 2a (not shown) located in the two sides of central frame 1 and two bearings at the end of each fixed wing 60. Central rod 2 rotates inside a hollow tube that runs the length of each fixed wing 60. Central rod 2 attaches perpendicular to two arms 3 by T-junctions 3a. Two tail rudders 62 may be attached perpendicular to the top surface of central frame 1 at the rear end of central frame 1. Tail rudders 62 may help stabilize to yaw and roll of central frame 1. At the four ends of arms 3 are four motors 12a with rotors 7. The axis of rotation of rotors 7 is perpendicular to arms 3. Arms 3, T-junctions 3a and central rod 2 form the basis for a firm structure that is H shaped motor frame 6. The firm structure may also be implemented as being formed from a single material such as from an injection-molded piece or in composite layers of carbon fiber for example.

Reference is now made to FIG. 6B, shows a side view of a flight maneuver of a fixed wing 60 of aerial vehicle 10a, in accordance with some embodiments of the present disclosure. Aerial is in a static flight mode at stage (i). The vertical take to stage 1 being initiated by user 71 and remote control console 82. Aerial vehicle 10a transitioning to move forward is indicated by arrow 64 in the direction of the Y-axis. At the static flight mode at stage (i), arms 3 are parallel with frame 1. Stabilizing motor 4 under the control of gimbal controller 9 specifically, rotates central frame 1 to provide an adjustment of the pitch angle of zero degrees between central frame 1 and motor frame 6, whilst maintaining central frame 1 in a horizontal position relative to the horizon in the static mode.

The stable transitioning forward mode from stage (i) to stage (ii) is shown by arrow 68. In the transition, stabilizing motor 4 provides a gimbal function to central frame 1. The gimbal function is achieved by the control of gimbal controller 9, to rotate central frame 1 to maintain the pitch angle of central frame 1 constant relative to the horizon. During the transition, flight controller 11 controls the rotation speeds of motors 12a via electronic speed controller (ESC) 12 (not shown) to enable a clockwise rotation of motor frame 6 so that at stage (ii), arms 3 are at a pitch angle π of around forty five degrees relative to central frame 1 and the Y-axis. During the entire transition from stage (i) to stage (ii) the pitch angle of central frame 1 stays constant relative to the horizon and does not allow aerial vehicle 10a to move up or down in term of pitch or left or right in terms of roll and/or yaw. The stable transitioning forward mode is by virtue of the rotation the clockwise rotation of motor frame 6 so that at stage (ii), arms 3 are at a pitch angle π of around forty-five degrees relative to central frame 1 and the Y-axis.

The stable transitioning forward mode at stage (ii) and beyond is an example of a fixed wing 60 configuration to give an increase in efficiency over long flight distances. The greater flight efficiency achieved in the fixed wing 60 configuration may be by comparison with the flight efficiency of aerial vehicle 10b moving forward but with the pitch angle of central frame 1 in relation to that of motor frame 6 at angle π=zero degrees, whilst maintaining the pitch angle of central frame 1 parallel to the horizon. Further, the transition from stage (i) to stage (ii) of aerial vehicle 10b of aerial vehicle 10b moving forward from one speed to a higher speed is stable. Moreover, the control of the controllers of aerial vehicle 10b enables the prevention of overshoot in a transition from a forward direction to a hovering position.

A benefit of fixed wing 60 configuration is that stabilization by stabilizing motor 4 maintains the pitch angle of central frame 1 constant relative to the horizon so that stabilizing motor 4 provides a single gimbal function to central frame 1 at a single central point of central frame 1. The single central point adding to the stability of central frame 1 by virtue of the balancing benefit that the single central point provides. Another benefit of fixed wing 60 configuration is the greater flight efficiency over long distances and faster velocities achieved. The greater flight efficiency and faster velocities of aerial vehicle 10a is compared to aerial vehicle 10 moving forward but with the pitch angle of central frame 1 in relation to that of motor frame 6 at angle π=zero degrees, whilst maintaining the pitch angle of central frame 1 parallel to the horizon. Whereas flying forwards with the pitch angle of central frame 1 in relation to that of motor frame 6 at angle π=zero degrees, faster forward velocities for aerial vehicle 10 may necessitate an additional fifth motor attached to the rear of central frame 1. Fixed wing 60 configuration of aerial vehicle 10a does not necessitate the need for the fifth motor thereby reducing costs and increased weight. Fixed wing 60 configuration also allows for aerial vehicle 10 to fly longer distances by virtue of the increased stability provided from both the single gimbal function and the ixed wing 60 configuration.

Reference is now made to FIG. 7, which shows a system block diagram of aerial vehicle 10b, in accordance with some embodiments of the present disclosure. Aerial vehicle 10b is the same as aerial vehicle 10 except for the inclusion of rotary encoder 67 and companion computer 66. Rotary encoder 67 may be implemented as a radial ring encoder. Rotary encoder 67 is mounted to stabilizing motor 4 to provide closed loop feedback signals by tracking the speed and/or position of central rod 2. There are a wide variety of motor encoder configurations available for rotary encoder 67 such as incremental or absolute, optical or magnetic, shafted or hub/hollow shaft, among others. The type of motor encoder used is dependent upon a number of factors, particularly motor type of stabilizing motor 4 for example, the application requiring closed-loop feedback, and the mounting configuration required. The closed loop feedback signals are fed in to companion computer 66, other signals from rotor frame IMU 5 via flight controller 11 and central frame IMU 8 via gimbal controller 9 are also fed in to companion computer 66.

By way of non-limiting example, reference is now made to FIG. 8 and FIG. 9, which show a side view of a flight maneuver of aerial vehicle 10*b* and a flow chart of a method 900 to enable the flight maneuver of aerial vehicle 10*b*, in accordance with some embodiments of the present disclosure. The flight maneuver of aerial vehicle 10*b* is shown in four stages (i), (ii), (iii) and (iv). At stage (i), aerial vehicle 10*b* is standing on level surface 80 in the XY axes, by use of four landing legs 13. A user 81 in proximity to aerial vehicle 10*b* initiates an activation of aerial vehicle 10*b*. The activation establishes a communication connection between the receiver 35 of aerial vehicle 10*b* and a remote control console 82 used by user 81. Remote control console 82 may include a radio frequency (RF) transmitter that transmits control instructions and other data that is receivable by the receiver 35 of aerial vehicle 10*b*.

At step 901, included in the activation is a calibration of aerial vehicle 10*b*. The calibration includes the utilization of rotary encoder 67 and companion computer 66. The utilization of rotary encoder 67 and companion computer 66 establishes the calibration of the closed loop feedback signals to track the speed and/or position of central rod 2. The calibration enables the deployment of aerial vehicle 10*b* in a static position at stage (i) to a vertical takeoff mode. The vertical takeoff mode indicated by arrow 83 in the direction of the Z-axis to a certain height at stage (ii). The calibration and subsequent deployment enabling stabilizing motor 4 under the control of gimbal controller 9 specifically, rotates central frame 1 to provide an adjustment of the pitch angle of zero degrees between central frame 1 and motor frame 6, whilst maintaining central frame 1 in a horizontal position relative to the horizon in a flying mode of aerial vehicle 10. Whereas to maintain certain levels of roll and yaw levels of central frame 1, flight controller 11 controls the rotation speeds of motors 12*a* via electronic speed controller (ESC) 12. In calibration step 901, the horizontal position of both central frame 1 and motor frame 6 is calibrated by aerial vehicle standing on level surface 80 in the XY plane.

The transition of vehicle 10*b* from a static position or still moving upward at stage (ii) to a moving forward is indicated by arrow 84. The transition under the control of gimbal controller 9, rotates central frame 1 to maintain the pitch angle of zero degrees between central frame 1 and motor frame 6, whilst maintaining central frame 1 in a horizontal position by utilization of flight controller 11. Therefore, the transition from the static position or still moving upward at stage (ii) to the moving forward of aerial vehicle 10*b* is stable. At step 903, while aerial vehicle 10*b* is stably moving forward, the first person view camera (FPV CAM) included in optic module 32 (not shown) attached to central frame 1 may be utilized to detect and recognize an object in the field of FPV CAM (not shown). At decision step 904, if the object has not been detected and recognized, user 81 viewing captured video images displayed on a screen of remote control console 82 may further stably maneuver aerial vehicle to enable a detection and recognition of the object. The captured images transmitted by video transmitter (TX) module 38 included in a communication control unit (CCU) 36 to remote control console 82.

At decision step 904, if the object has been detected and recognized, at step 905, central frame 1 is rotated by stabilizing motor 4 to alter the pitch angle of central frame 1 and the first person view camera (FPV CAM) to angle π reactive to longitudinal axis Y as shown at stage (iii). Thereby, targeting by the rotating to centralize the object in the field of view of the FPV CAM. The targeting may be performed while aerial vehicle 10*b* is static or is moving. The targeting includes signals from rotor frame IMU 5 via flight controller 11 and central frame IMU 8 via gimbal controller 9 fed into companion computer 66. The targeting may be further enhanced by virtue of utilization of rotary encoder 67 and companion computer 66, to establish the closed loop feedback signals to track the speed and/or position of central rod 2 accurately. In other words, the pitch angle π of central frame 1 is dynamically altered to increase as aerial vehicle 10 approaches the object whilst maintaining the rotor frame 6 horizontally level.

At step 907, flight controller 11 controlling motors 12*a* to position arms 3 of motor frame 6 to be perpendicular with the longitudinal axis of central frame 1 whilst accurately and stably maintaining the pitch angle of central frame 1 responsive to the targeting at step 905 to centralize the object in the field of view of the FPV CAM. Therefore, the transition from the position of arms 3 at stage (iii) to be perpendicular with the longitudinal axis of central frame 1, while moving aerial vehicle 10*b* towards the object indicted by arrows 85 at stage (iv) is stable. Further, the speed of movement of aerial vehicle 10*b* towards the object by virtue of arms 3/motors 12*a* is vastly increased compared to moving forward with pitch angle of zero degrees between central frame 1 and motor frame 6. Therefore, the adaptive aerodynamic efficient design of aerial vehicle 10*b* that includes the rotation of central frame 1 about central rod 2, gives longer flight endurance, higher flight speed and increased efficiency of flight controller 11 and is less resistant to wind.

As with aerial vehicles 10 and 10*a*, stabilizing motor 4 of aerial vehicle 10*b* provides a single gimbal function to central frame 1 at a single central point of central frame 1. The single central point adding to the stability of central frame 1 by virtue of the balancing benefit that the single central point provides. By virtue of the single gimbal function, items housed and attached to central frame 1 such as the first person view camera (not shown), the flashlight (not shown), and the laser pointer (not shown) included in optic module 32 (not shown) and complementary payloads such as elements 45 (not shown) do not require further gimbal stabilizers for their control and stabilization Eliminating the need for further gimbal stabilizers further reduces costs and increased weight.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments of the present disclosure and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An aerial vehicle comprising:
a central frame electro-mechanically connected to a central frame inertial measurement unit (IMU) adapted to output central frame inertial measurements to at least one controller;
a motor frame comprising
a central rod mounted in perpendicular to a longitudinal axis of the central frame;
a pair of lateral arms each fixated to a different end of the central rod in parallel to the longitudinal axis of the central frame;
motors attached opposing sides of the longitudinal axis of each lateral arm, each motor having a rotor;
a motor frame IMU connected to the motor frame and adapted to output motor frame inertial measurements of the motor frame to the at least one controller;
wherein the controller is configured to maintain and adjust the roll and yaw of central frame based from measurements made by motor frame IMU by adjusting the rotational speed of each motor and the rotational direction of each rotor;
wherein the central frame is further electro-mechanically connected to:
the at least one controller adapted to calculate control signals for rotating the central frame according to the central frame inertial measurements, and
a stabilizing motor in the central frame connected to the central rod adapted to rotate the central frame according to the control signals.

2. The aerial vehicle of claim 1, wherein the at least one controller is at least one of a flight controller and a gimbal controller.

3. The aerial vehicle of claim 1, wherein the rotation of the central frame under control of the gimbal controller maintains a steady angle of pitch of the central frame.

4. The aerial vehicle of claim 1,
wherein each of central frame IMU and the motor frame IMU are utilized separately, the central frame IMU to detect changes in the axes of pitch of the central frame and the motor frame IMU to detect changes in the pitch, roll, and yaw of the motor frame, and to convey the changes to the gimbal controller and the flight controller respectively, wherein a pitch angle of the central frame in the axes relative to the horizon is with respect to control signals from the gimbal controller applied to stabilizing motor.

5. The aerial vehicle of claim 1, wherein each lateral arm includes a rotor where the axis of rotation is perpendicular to the longitudinal axis.

6. The aerial vehicle of claim 1, wherein the central frame is aerodynamic.

7. The aerial vehicle of claim 1, wherein a rotation of central rod provides an adjustment of an attack angle of the motor frame in relation to the central frame.

8. The aerial vehicle of claim 1, wherein the adjustment of the attack angle of the motor frame relative to a horizon is without a substantial increase of drag when the central frame is parallel to the horizon.

9. The aerial vehicle of claim 1, wherein the central frame contains a main power board, the flight controller, the gimbal controller, a first person view camera, a video transmitter module and one or more flight batteries.

10. The aerial vehicle of claim 1, wherein the motor frame is H shaped.

11. A method for an optimization of a flight process for an aerial vehicle that includes a motor frame and a central frame, the method comprising:

connecting mechanically a central rod of the motor frame through the central frame perpendicular to a longitudinal axis of the central frame;

measuring the inertia of the central frame with a central frame inertial measurement unit (IMU);

measuring the inertia of the motor frame with a motor frame IMU;

controlling the yaw and roll of the central frame in the flight mode based on the according to the inertial measurement of the motor frame IMU; and rotating the central frame pitch with a stabilizing motor, according to the measurement of the central frame IMU.

12. The method of claim 11, wherein the flight mode of the aerial vehicle is at least one of hovering in a static position, moving upwards or downwards, moving forwards or backwards, moving left and right, moving left and right in the static position, moving left and right while moving upwards or downwards, moving left and right while moving forwards or backwards.

13. The method of claim 11, further comprising:

enabling a constant pitch angle difference between the central frame and the motor frame with respect to the longitudinal axis; and

maintaining during the enabling and while transitioning from the flight mode to another flight mode, an orientation of the central frame with respect to a horizon, wherein the maintaining provides a single gimbal function to the central frame at a single central point of the central frame.

14. The method of claim 11 further comprising:

in the flight mode, selecting a desired velocity and maneuver of the motor frame without a substantial increase of the drag imposed by the central frame in the direction of travel of the aerial vehicle.

15. The method of claim 11, wherein and a pair of lateral arms are each fixated to a different end of the central rod, wherein the pair of lateral arms are in parallel to the longitudinal axis of the central frame, wherein each lateral arm includes at least one motor and each motor has a rotor, wherein the axis of rotation of the rotor is perpendicular to the longitudinal axis.

16. The method of claim 11, further comprising:

detecting changes in the axes of pitch of the central frame with the central frame IMU and pitch, roll and yaw of the motor frame with the motor frame IMU, respectively; and conveying the changes to a gimbal controller and a flight controller respectively, wherein the levelling of the central frame in the axes is with respect to control signals from the gimbal controller to the stabilizing motor.

17. The method of claim 11, wherein the central frame is aerodynamic.

18. The method of claim 11, wherein the adjustment of the attack angle of the motor frame relative to a horizon is without a substantial increase of drag when the central frame is parallel to the horizon.

19. The method of claim 11, wherein the central frame contains a main power board, the flight controller, the gimbal controller, a first person view camera, a video transmitter module and one or more flight batteries.

* * * * *